No. 630,155. Patented Aug. 1, 1899.
W. R. WILLIAMS.
VEGETABLE CUTTER.
(Application filed July 11, 1898.)
(No Model.)
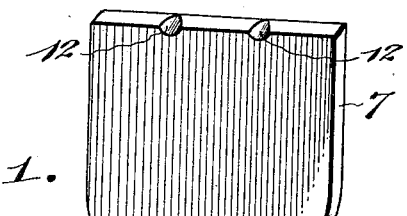
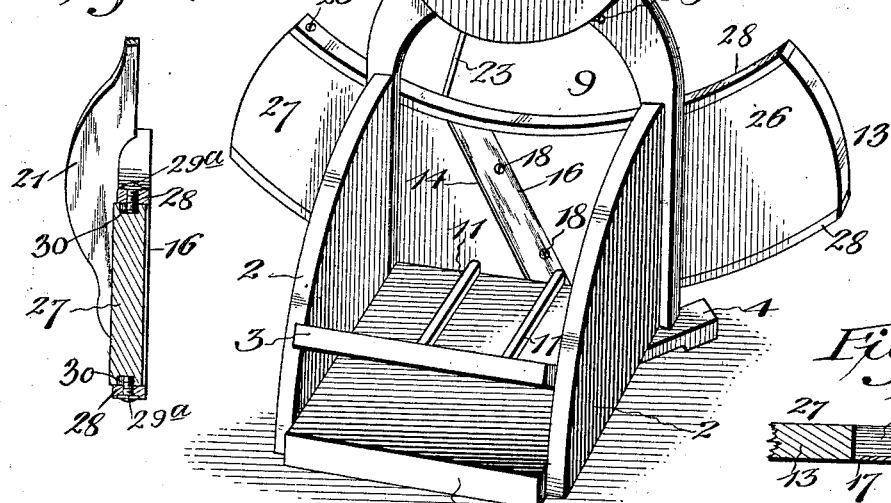
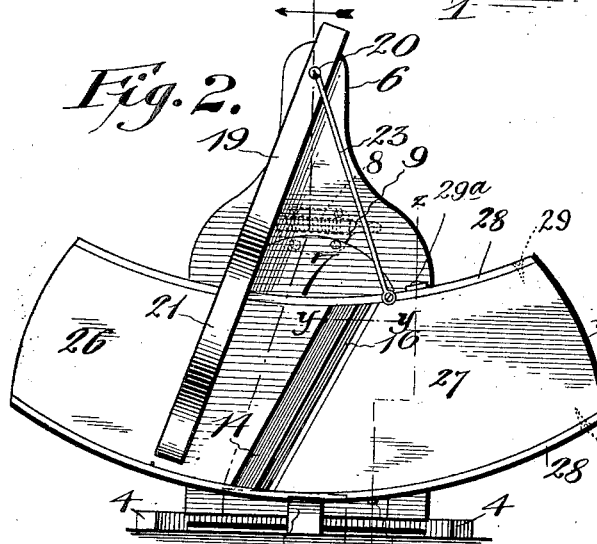
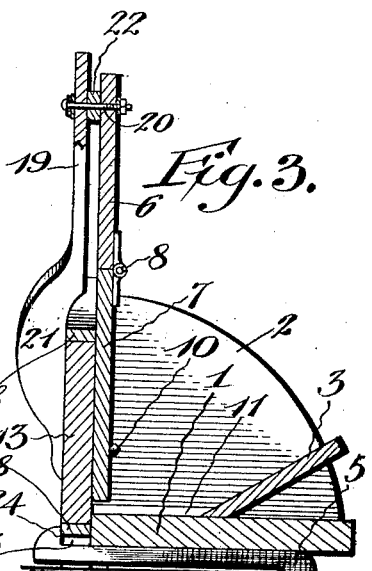
Witnesses William R. Williams, Inventor.
By his Attorneys,
THE NORRIS PETERS CO., PHOTO-LITHO., WASHINGTON, D. C.

UNITED STATES PATENT OFFICE.

WILLIAM R. WILLIAMS, OF PHILIPSBURG, PENNSYLVANIA, ASSIGNOR OF ONE-HALF TO CHARLES L. WILLIAMS, OF SAME PLACE.

VEGETABLE-CUTTER.

SPECIFICATION forming part of Letters Patent No. 630,155, dated August 1, 1899.

Application filed July 11, 1898. Serial No. 685,686. (No model.)

*To all whom it may concern:*

Be it known that I, WILLIAM R. WILLIAMS, a citizen of the United States, residing at Philipsburg, in the county of Centre and State of Pennsylvania, have invented a new and useful Vegetable-Cutter, of which the following is a specification.

This invention relates to fruit and vegetable cutters of that class embodying a hopper and a knife-frame adapted to move across the discharge-opening of the hopper.

The object of the invention is to provide certain new and useful improvements in the mounting and arrangement of the knife-frame, whereby a simpler and more easily-operated device is produced.

To this end, therefore, the present invention consists in certain novel features which will be hereinafter more fully described, shown in the drawings, and particularly pointed out in the appended claim.

In the drawings, Figure 1 is a rear perspective view of the device. Fig. 2 is a front elevation thereof. Fig. 3 is a longitudinal sectional view taken on the line $x\ x$ of Fig. 2. Fig. 4 is a detail sectional view taken on the line $y\ y$ of Fig. 2. Fig. 5 is a detail sectional view taken on the line $z\ z$ of Fig. 2.

Corresponding parts in the several figures are denoted by like characters of reference.

Referring to the drawings, the hopper of the device comprises a bottom 1 and two side pieces 2 and a rear inclined chute 3 to facilitate the placing of the fruit or vegetable to be sliced. The hopper thus formed constitutes the general body of the device and is supported by means of two side or corner feet 4 and a rear foot 5, forming a triangular base. The side feet, it will be observed, extend in a diagonal direction part way across the bottom of the hopper, to which they are fastened, and extend beyond the corners thereof, forming an extension-base to prevent wabbling or upsetting of the device.

The front of the hopper is extended upward and above the latter for a suitable distance, forming an arm 6, and a door or follower 7 is cut therefrom, forming an opening 9 the full width and height of the hopper. This follower is hinged at its top to the arm 6 by means of any ordinary or suitable spring-hinge 8, so that when the follower is in closed position it fits snugly within the opening 9 and is flush with the outside of the hopper. A suitable handle 10 is provided upon the follower, whereby the latter may be operated. The bottom of the hopper is provided with a pair of longitudinal strips 11, whereby a round apple or potato or the like will be prevented from turning or rolling when being sliced. The bottom edge of the follower is provided with grooves or notches 12 to receive the strips 11 when the follower is closed.

The cutting mechanism comprises a segmental board or frame 13, composed of two sections 26 and 27, which are connected together by means of marginal strips 28 at the top and bottom of the sections. The inner opposing ends of these sections are spaced apart, one of them being beveled outward, forming the oblique knife-slot 14, as plainly illustrated in Fig. 4. The inner face of the section 26 next the knife-opening is notched or recessed, as at 15, to receive the knife-blade 16, which is mounted in position by means of screws 18. The cutting edge 17 of the knife-blade overlaps the slot 14 and is arranged parallel with the edge of the slot.

To provide for adjusting the device to cut thick or thin slices, the section 27 is connected to the marginal strips 28 near its outer extremity by means of screws 29 or a single bolt extending clear through from top to bottom and forms a pivot upon which the section may be turned toward or away from the knife, as will be understood. The section 27 is held in its adjusted position by means of screws $29^a$, which enter transverse slots 30 in the top and bottom, respectively, of the section. By loosening the screws $29^a$ the section 27 may be swung toward or away from the knife-blade upon the screws 29 as a pivot, and by then tightening the screws $29^a$ the device is adjusted to cut as desired. This adjustment is clearly indicated in Fig. 5, in which the section 27 is shown swung away from the knife to obtain a thick cut. By this arrangement the knife is never moved from its normal position, and thus is always firm and does not become loose by adjustment, as in other such devices where the knife-blade itself is adjusted. The object of having the knife arranged at an angle is to obtain a drawing or sliding cut, which is more effective than if the knife were drawn straight across the fruit or vegetable. This frame is mounted in an operative position by means of a suspending-arm 19, secured to the frame to one side of the slot 14 therein and pivoted to the upper end of arm 6 by means of a bolt 20, arranged over the center of the hopper-opening 9. This arm is provided with a suitable operating-handle 21 and is spaced away from the arm 6 by means of a washer 22, which takes up wear and disposes the swinging arm so that the knife-frame may move freely between said arm and the front of the hopper. The handle 21 is formed by offsetting the lower end of the suspending-arm 19 away from the discharge-opening of the hopper, and the knife-frame is connected to the inner face of the offset portion, whereby the frame is properly disposed with relation to the discharge-opening of the hopper. A rod 23 connects the frame with the pivot-bolt 20 to more substantially mount the said frame.

To guide the swinging frame in its movement, the rear foot 5 extends beyond the front of the hopper and swinging frame and is provided with a shoulder 24, forming a guiding groove or notch 25, receiving the lower edge of the frame and preventing the same from moving out or away from the device. By this arrangement the knife will always be in its proper position and cannot miss cutting at each stroke of the frame.

In the operation of the device the hinged door or follower 7 is first opened by means of its handle 10, and the fruit or vegetable to be cut is placed in the hopper, resting between the strips 11. Then the spring-operated follower is let down against the fruit or vegetable and acts automatically to feed the latter to the knife. The knife-frame is then operated by grasping the operating-handle 21 and swinging the frame back and forth in front of the opening 9, whereby the knife is caused to cut the fruit or vegetable, and the slices or cuttings will feed out through the knife-opening 14, and thereby not clog or choke the knife. By reason of the follower fitting flush with the front of the hopper, as heretofore described, the entire fruit or vegetable is exposed to the action of the knife without danger of cutting the fingers of the operator, as the follower feeds automatically by the action of the spring-hinge.

This construction and arrangement, as herein described, provides a simple and effective device which is capable of various changes in its form, proportion, and minor details without departing from the spirit and scope or sacrificing any of the advantages thereof, and therefore I do not wish to be understood as limiting myself to the precise construction and arrangement as herein set forth.

Having thus described the invention, what I claim, and desire to secure by Letters Patent, is—

In a vegetable-cutter, the combination of a hopper, comprising a bottom, two sides, a rearwardly-inclined chute held between the sides and extending partially over the bottom, and longitudinal strips fixed to the bottom in parallel relation and running from the front termination of the chute to the front end of the hopper, the rear end of the hopper being open, as well as the top, an arm extended above the front open end of the hopper, a follower having its upper edge hinged to the rear side of a part of the said arm and provided with bottom edge notches to fit over the said longitudinal strips, and a segmental board or frame pivotally depending in front of and close to the hopper and provided with a grip for oscillating the same, the said board or frame having a diagonally-disposed adjustable knife therein.

In testimony that I claim the foregoing as my own I have hereto affixed my signature in the presence of two witnesses.

WILLIAM R. WILLIAMS.

Witnesses:
ROBT. L. SCOTT,
WM. E. IRWIN.